(12) United States Patent
Dunn et al.

(10) Patent No.: US 9,268,166 B2
(45) Date of Patent: *Feb. 23, 2016

(54) NVIS CAMPATIBLE BACKLIGHT DEVICE AND LCD USING THE SAME

(71) Applicant: American Panel Corporation, Alpharetta, GA (US)

(72) Inventors: William Dunn, Alpharetta, GA (US); Harry Presely, Alpharetta, GA (US); Chris Tran, Dacula, GA (US)

(73) Assignee: AMERICAN PANEL CORPORATION, Alpharetta, GA (US)

( * ) Notice: Subject to any disclaimer, the term of this patent is extended or adjusted under 35 U.S.C. 154(b) by 95 days.

This patent is subject to a terminal disclaimer.

(21) Appl. No.: 13/937,756

(22) Filed: Jul. 9, 2013

(65) Prior Publication Data

US 2014/0160788 A1    Jun. 12, 2014

Related U.S. Application Data

(63) Continuation of application No. 12/897,829, filed on Oct. 5, 2010, now Pat. No. 8,480,281.

(60) Provisional application No. 61/248,870, filed on Oct. 5, 2009.

(51) Int. Cl.
*F21V 7/22*       (2006.01)
*G02F 1/1335*   (2006.01)
*F21V 8/00*       (2006.01)

(52) U.S. Cl.
CPC ........ *G02F 1/133509* (2013.01); *G02B 6/0026* (2013.01); *G02B 6/0068* (2013.01);

(Continued)

(58) Field of Classification Search
CPC .... G02B 6/0068; G02B 6/026; G02B 6/0073; G02B 6/0018; G02B 6/0026; G02F 1/133603; G02F 1/133509; G02F 1/133615; G02F 2001/133626
USPC ......... 362/606, 607, 608, 612, 613, 621, 622, 362/625, 626
See application file for complete search history.

(56) References Cited

U.S. PATENT DOCUMENTS 5,982,090 A    11/1999    Kalmanash
5,986,728 A    11/1999    Bernard
(Continued)

FOREIGN PATENT DOCUMENTS

JP    06175127    6/1994
JP    2006236998    9/2006
(Continued)

*Primary Examiner* — Y M Lee
(74) *Attorney, Agent, or Firm* — Standley Law Group LLP (57) ABSTRACT

A backlight device for a liquid crystal display containing a substantially planar light guide with a light emission surface and a light-collecting portion opposing the light emission surface. A pair of opposing side portions may define the periphery of the light guide. A first plurality of LEDs are placed so as to direct the emitted light into the light-collecting portion. An NVIS filter is preferably placed adjacent to at least one of the side portions. A second plurality of LEDs are placed to direct the emitted light through the NVIS filter and into a side portion of the light guide. Alternative embodiments can contain NVIS filters and LEDs along additional edge portions of the light guide. Some embodiments may use directing elements or slanted surfaces of the light guide to direct the light from the second plurality of LEDs into the edge portions of the light guide.

20 Claims, 9 Drawing Sheets

(52) U.S. Cl.
CPC ........ *G02B6/0073* (2013.01); *G02F 1/133603* (2013.01); *G02F 1/133615* (2013.01); *G02B 6/0018* (2013.01); *G02B 6/0021* (2013.01); *G02F 2001/133626* (2013.01)

(56) References Cited

U.S. PATENT DOCUMENTS

| | | | |
|---|---|---|---|
| 6,419,372 B1 * | 7/2002 | Shaw et al. | 362/231 |
| 6,789,921 B1 | 9/2004 | Deloy | |
| 6,842,204 B1 * | 1/2005 | Johnson | 349/74 |
| 7,036,946 B1 * | 5/2006 | Mosier | 362/27 |
| 7,040,794 B2 | 5/2006 | Bernard | |
| 7,465,073 B2 | 12/2008 | Lee | |
| 7,525,611 B2 | 4/2009 | Zagar | |
| 7,726,826 B2 | 6/2010 | Kusano | |
| 2003/0012035 A1 | 1/2003 | Bernard | |
| 2008/0266852 A1 | 10/2008 | Valerio | |

FOREIGN PATENT DOCUMENTS

| | | |
|---|---|---|
| JP | 2008261918 | 10/2008 |
| JP | 2009524911 | 7/2009 |

* cited by examiner

NVIS CAMPATIBLE BACKLIGHT DEVICE AND LCD USING THE SAME

CROSS-REFERENCE TO RELATED APPLICATIONS

This application is a continuation of and claims priority to U.S. application Ser. No. 12/897,829, filed on Oct. 5, 2010. U.S. application Ser. No. 12/897,829 is a non-provisional application of U.S. Application No. 61/248,870 filed on Oct. 5, 2009 and incorporated by reference herein as though re-written in its entirety.

FIELD OF THE EXEMPLARY EMBODIMENTS

The exemplary embodiments are directed generally towards backlight devices for liquid crystal displays (LCDs) used in conjunction with night vision imaging systems.

BACKGROUND OF THE GENERAL INVENTIVE CONCEPT

In the past, LCDs have been used in a wide variety of environments, including displays within the cockpit of an aircraft as well as ground-based vehicles. In some of these environments it is desirable to have LCDs with dual mode backlighting. These displays have one mode for use during daylight operation and a second mode for nighttime operation when an observer may be using a night vision imaging system, hereafter 'NVIS.' It has been known to use filtered light during the NVIS mode as typical night vision components are sensitive to light within a certain wave length range. Filtering the light allows the LCD to be used simultaneously with NVIS equipment. For example, MIL-STD-3009 (United States Department of Defense Interface Standard Lighting, Aircraft, Night Vision Imaging System (NVIS) Compatible) specifies the small amount of light (at wavelengths longer than ~650 nm) which may be emitted by an NVIS-compatible display. The disclosure of MIL-STD-3009 is herein incorporated by reference in its entirety. Without other changes, the filtering which helps NVIS performance would degrade the optical performance (mainly color and brightness) of the same LCD when used in daylight operations.

LCDs require a backlight in order to produce an image as these devices do not produce light themselves. Previous devices have used backlights with two sets of light emitting diodes (LEDs): one set for daylight and a second set for nighttime. The set of LEDs which are used during nighttime operations are typically covered by an NVIS filter (sometimes called 'hot mirror' filters) which absorb or reflect electromagnetic radiation within a certain wavelength. Some displays which use direct backlighting techniques for the nighttime operations may place a small NVIS filter over each LED. With some displays containing hundreds (or thousands) of LEDs, the manufacturing costs for producing and assembling the many small filters can be very high. Other displays may filter all of the LEDs (even the daytime LEDs) which typically results in reduced color gamut and brightness for the display.

Further, the light uniformity of the backlight is often important and desirable. Because LEDs are point sources of light, it is typically important that their natural illumination is modified to produce a uniform level of illumination across the LCD screen. Light-diffusing (and sometimes scattering) devices have been commonly used for this purpose. However, when used in a direct-lit fashion (as opposed to edge-lit) there must be a space between the LEDs and the diffusing devices (known sometimes as a 'throw distance') which forces the entire LCD assembly to become thicker. To further increase the light uniformity of the backlight, a large number of low-power LEDs is typically more desirable than a small number of high-power LEDs. Not only does this increase the light uniformity, but low-power LEDs are typically more efficient than high-power LEDs. Thus, the use of many low-power LEDs can result in power savings as well as smaller amounts of heat generation.

However, as mentioned above, using more LEDs for nighttime operation may increase the manufacturing costs by adding more filters and assembly time to install the filters. This problem is especially troublesome for the nighttime LEDs because the human eye's sensitivity to light variation is much more noticeable at low levels (dim) rather than high levels (bright). Thus, it is very desirable to maximize the uniformity of the light emanating from the nighttime LEDs. Further, it is also desirable to produce the brightest possible daytime LCD with the highest possible contrast ratio while also minimizing the thickness of the LCD assembly and its overall energy consumption.

SUMMARY OF THE EXEMPLARY EMBODIMENTS

An exemplary embodiment uses a hybrid backlight assembly which uses a combination of direct and edge lighting technology to obtain the optimum performance for the overall LCD assembly. For the daytime operations, a modular direct backlight setup is used where the traditional light diffusing/scattering sheet has been removed and the throw distance has been largely decreased. A specialized light guide provides a scattering and diffusing effect where the light guide can be placed closer to the LCD stack, providing a very thin overall assembly. Because of the direct lighting setup, the daytime LEDs can produce a high level of luminance and can also be controlled for dynamic localized dimming of certain areas of the backlight. The localized dimming capability allows sections of the backlight to be 'dimmed' or have their respective illumination levels decreased when it is not necessary. This saves power, improves the contrast ratio, and reduces the amount of heat that the backlight generates.

For the nighttime operations, low power LEDs may be oriented in an edge-lit fashion along at least one edge of the specialized light guide. A substantially continuous hot mirror filter may be placed along the light guide as well, between the nighttime LEDs and the light guide. The LEDs may be somewhat densely spaced so as to maximize the uniformity of the NVIS compatible light. In some embodiments, there may be an array of nighttime LEDs placed on two opposing edges of the display. By using low power LEDs the power density is distributed more evenly and the backlight can provide a more efficient light source.

Alternative embodiments may place the daytime LEDs in a traditional direct-lit fashion with the nighttime LEDs placed in an edge-lit fashion with a more traditional light guide. In some embodiments, both the daytime LEDs and the nighttime LEDs can be mounted onto a single printed circuit board (PCB) assembly. This can greatly reduce assembly times and manufacturing costs.

Overall, the LCD assembly can be thinner, lighter, and cheaper to manufacture. The luminance uniformity is superior (especially with the NVIS LEDs) and the daytime operations provide a high contrast ratio, high luminance, lower power consumption, and lower heat generation. These features are important especially with aircraft and ground vehicles where weight and power consumption are often important design constraints.

BRIEF DESCRIPTION OF THE DRAWINGS

In addition to the features mentioned above, other aspects of the will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Herein, the terms 'vertical' and 'horizontal' will be used to describe the relative orientation of different elements. Thus, as used herein, 'horizontal' means substantially parallel to the associated liquid crystal stack. Also, as used herein, 'vertical' means substantially normal to the associated liquid crystal stack.

Figure 1A:
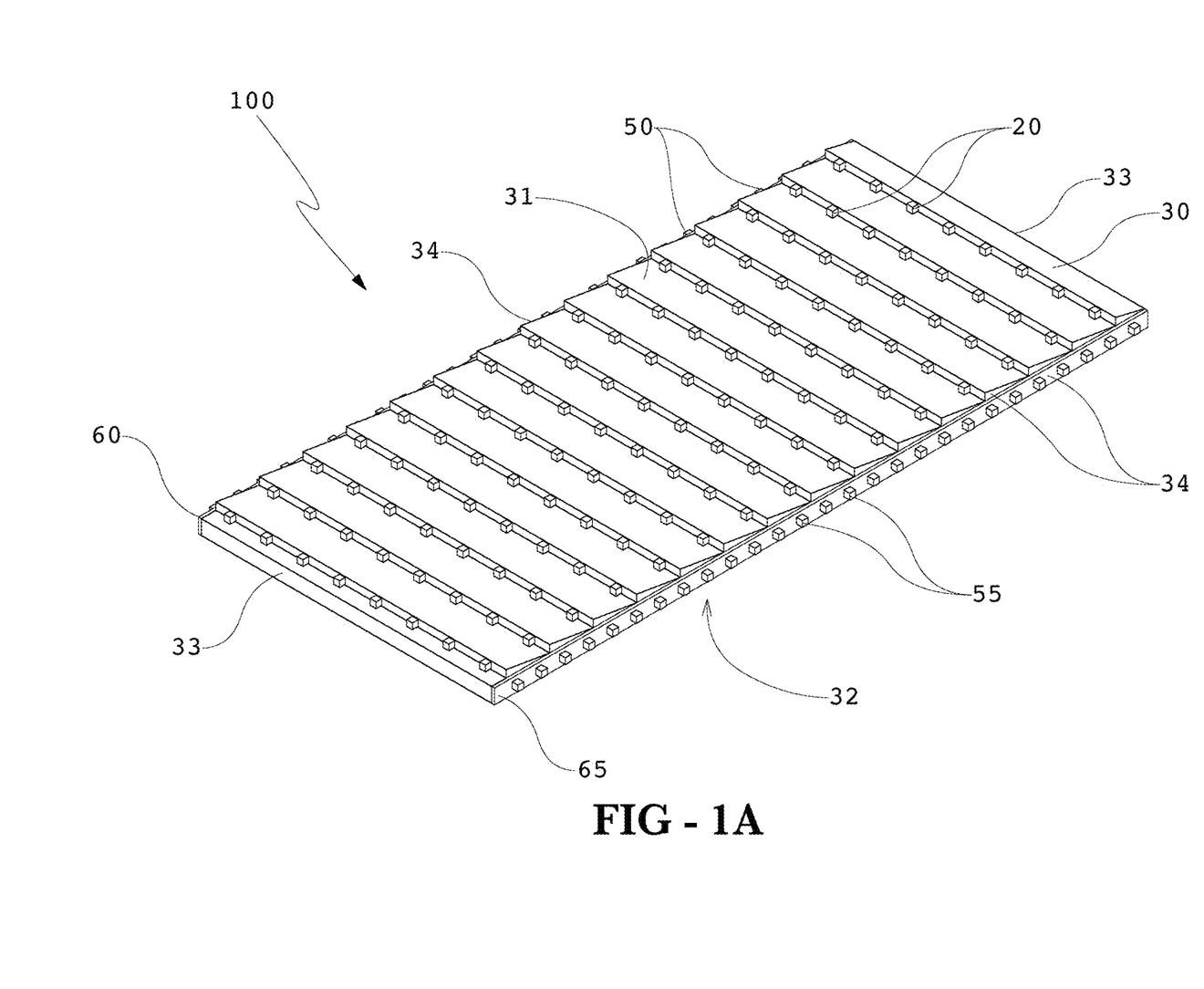
FIG. 1A is a bottom perspective view of an exemplary embodiment of the backlight device.

FIG. 1A is a bottom perspective view of one embodiment of the backlight device 100. An exemplary light guide 30 would preferably consist of several surfaces. A light collecting surface 31 is adapted to collect light from a first plurality of LEDs 20. A light emission surface 32 may oppose the light collecting surface 31 and is adapted to emit light into the liquid crystal display stack (or whatever component is placed between the backlight device 100 and the liquid crystal display stack). A first 33 and second 34 pair of opposing edge surfaces may be used to define the general periphery of the light guide 30. A NVIS filter 65 may be placed adjacent to at least one of the edge portions 34. A second plurality of LEDs 55 are preferably arranged so that the light is emitted through the NVIS filter 65 and into the light guide 30. Some embodiments may also include a second NVIS filter 60 and a third plurality of LEDs 50 arranged so that the emitted light passes through the second NVIS filter 60 and into the light guide 30. The second NVIS filter 60 and third plurality of LEDs 50 are preferably placed on the edge surface which opposes the first NVIS filter 65 and second plurality of LEDs 55, but this is not required.

Figure 1B:
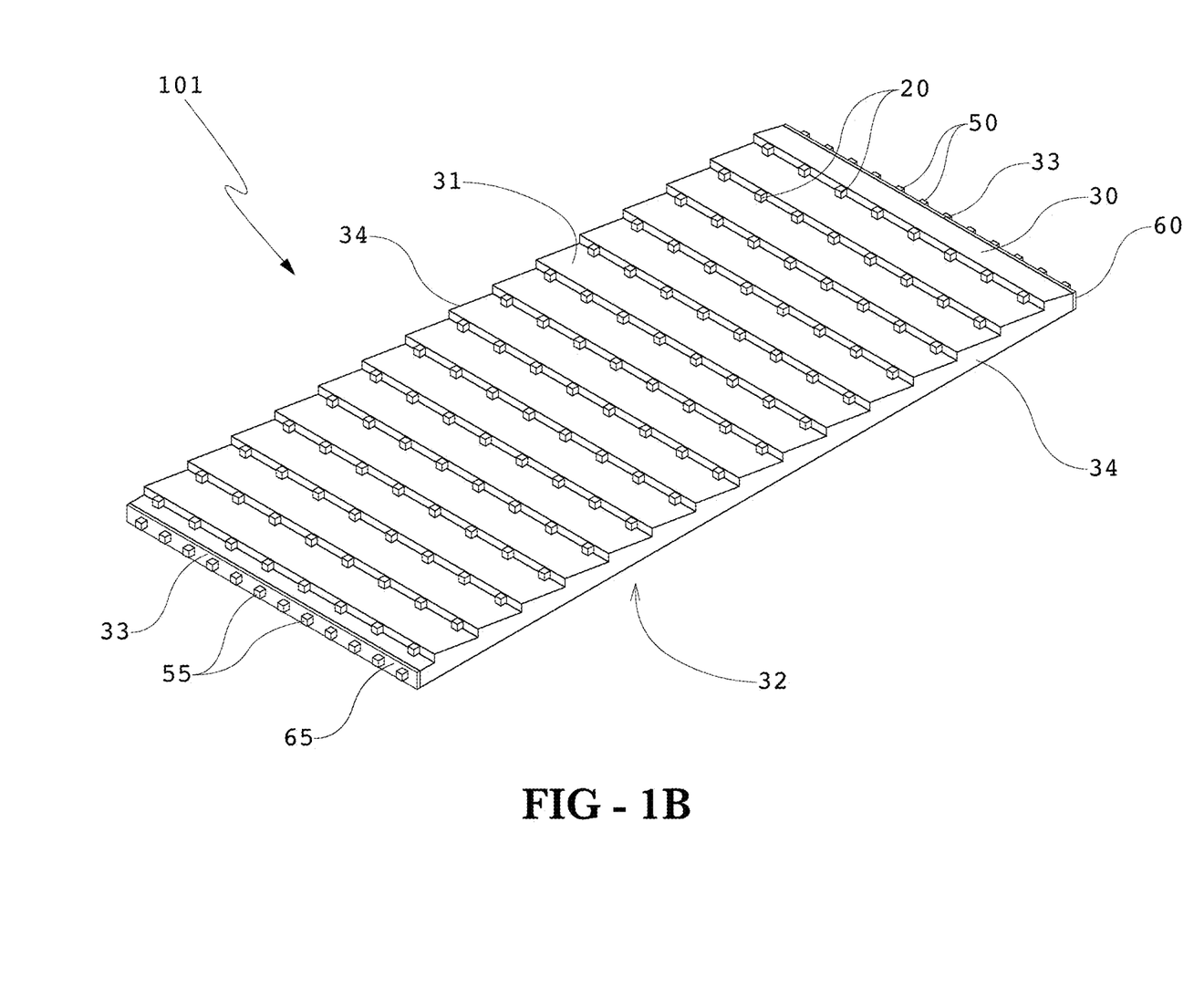
FIG. 1B is a bottom perspective view of an alternative embodiment of the backlight device.

FIG. 1B is a bottom perspective view of an alternative embodiment of the backlight device 101. In this embodiment, NVIS filter 65 is placed adjacent to one of the edge portions 33. Again, a second plurality of LEDs 55 are preferably arranged so that the light is emitted through the NVIS filter 65 and into the light guide 30. Some embodiments may also include a second NVIS filter 60 and a third plurality of LEDs 50 arranged so that the emitted light passes through the second NVIS filter 60 and into the light guide 30. In this particular embodiment, the second NVIS filter 60 and third plurality of LEDs 50 are placed adjacent to edge portion 33. The second NVIS filter 60 and third plurality of LEDs 50 are preferably placed on the edge surface which opposes the first NVIS filter 65 and second plurality of LEDs 55, but this is not required.

Figure 1C:
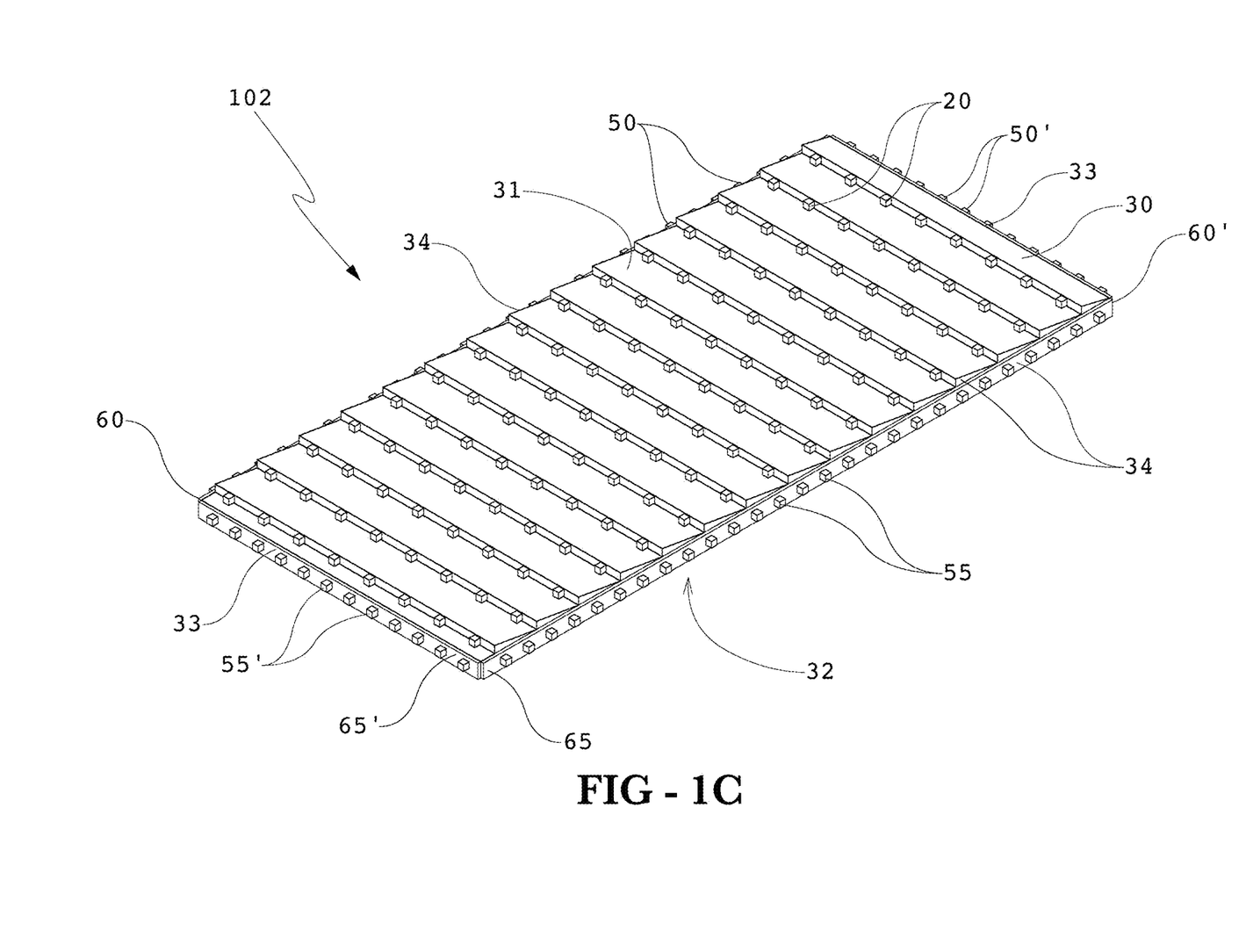
FIG. 1O is a bottom perspective view of an alternative embodiment of the backlight device.

FIG. 1C is a bottom perspective view of an alternative embodiment of the backlight device 102. In this embodiment, NVIS filters and associated LEDs are placed adjacent to the first 33 and second 34 pair of opposing edge surfaces, which may be used to define the general periphery of the light guide 30. Similar to the embodiment of the backlight device 100 in FIG. 1A, a NVIS filter 65 and a second plurality of LEDs 55 may be placed adjacent to at least one of the edge portions 34. Further, a second NVIS filter 60 and a third plurality of LEDs 50 are arranged so that the emitted light passes through the second NVIS filter 60 and into the light guide 30. In addition, a third NVIS filter 65' and fourth plurality of LEDs 55' are placed adjacent to one of the opposing edge portions 33. A fourth NVIS filter 60' and fifth plurality of LEDs 50' is also placed adjacent to one of the opposing edge portions 33.

Figure 2:
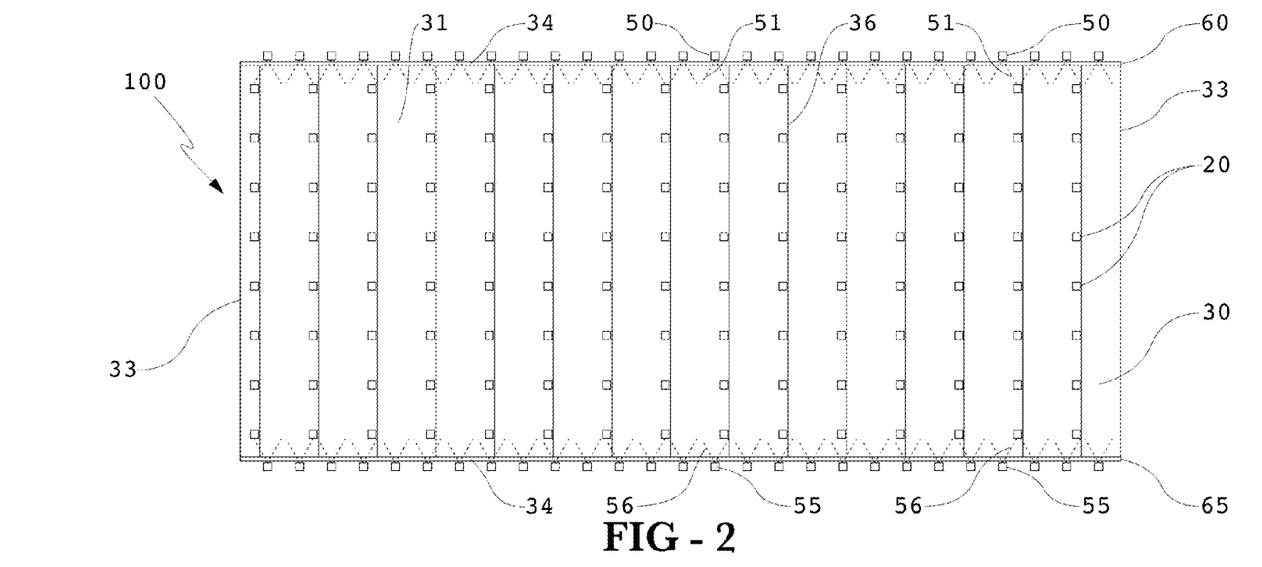
FIG. 2 is a planar bottom view of the embodiment from FIG. 1.

FIG. 2 is a planar bottom view of the embodiment of the backlight device 100 from FIG. 1A. This figure illustrates the light 56 emitted from the second plurality of LEDs 55 which preferably passes through the NVIS filter 65 and into the light guide 30. Also shown in this figure is the light 51 emitted from the optional third plurality of LEDs 50 which preferably passes through the NVIS filter 60 and into the light guide 30.

Figure 3:
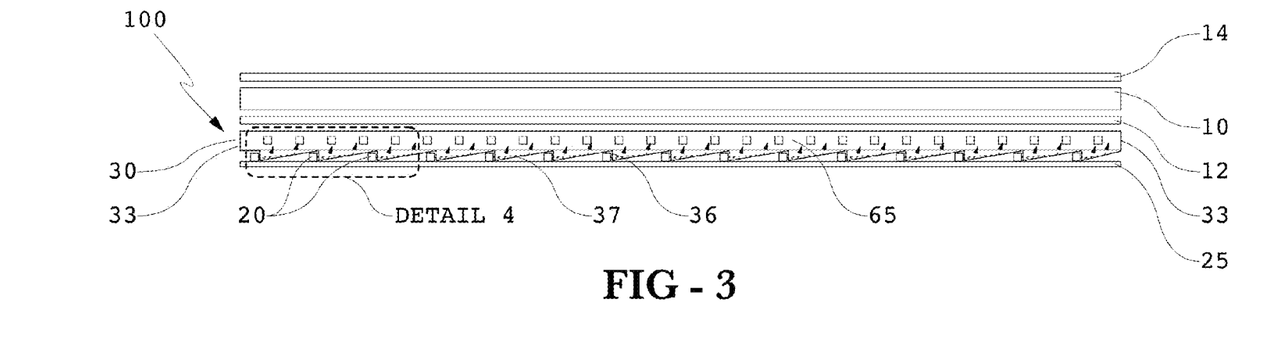
FIG. 3 is a planar side view of an exemplary embodiment of a liquid crystal display using the embodiment of the backlight device from FIGS. 1 and 2.

FIG. 3 is a planar side view of an exemplary embodiment of a liquid crystal display using the embodiment of the backlight device 100 from FIGS. 1A and 2. Here, the basic components for a typical LCD are shown: a front polarizer 14, a liquid crystal stack 10, and a rear polarizer 12. As well known in the art, LCD assemblies may contain a variety of additional layers such as antireflection layers (AR), additional linear or circular polarizers, phase retarders, light diffusing or scattering layers, alignment layers, heater layers, EMI shielding layers, etc. The components of a liquid crystal stack 10 are also well known in the art and can vary depending on the type of liquid crystal material being used and its specific application. A typical liquid crystal stack 10 would contain two transparent substrates (typically glass or plastic) with liquid crystal material sandwiched in between. An electrical controlling mechanism (sometimes an electrode or thin-film transistor) is typically used to apply an electrical potential to portions (pixels or sub-pixels) of the liquid crystal material. As the specifics of liquid crystal stacks 10 and other optical layers are not necessary for the exemplary embodiments, they will not be discussed further herein. The exemplary embodiments herein can be applied to any type of LCD assembly, which may include more or less components than what is shown in the various figures.

This particular embodiment of the light collecting surface 31 of the light guide 30 uses a 'saw-tooth' type of profile for the light collecting surface 31 which, in this embodiment is comprised of alternating substantially vertical sub-surfaces 36 and slanted sub-surfaces 37. For the daytime operations of the display, the first plurality of LEDs 20 (daytime) may be placed adjacent to the various vertical sub-surfaces 36 of the light guide 30. These daytime LEDs 20 may be mounted to a supporting structure 25 which may be a printed circuit board (PCB). In an exemplary embodiment, the LEDs 20 would be mounted on a metal core PCB which has a low level of thermal resistance between the surface containing the LEDs 20 and the opposing surface. The surface of the supporting structure 25 which contains the LEDs 20 may be reflective so that light rays will be re-directed towards the light guide 30 and only minimally absorbed. A 'white' surface may be used or a reflective coating may be applied.

Figure 4A:
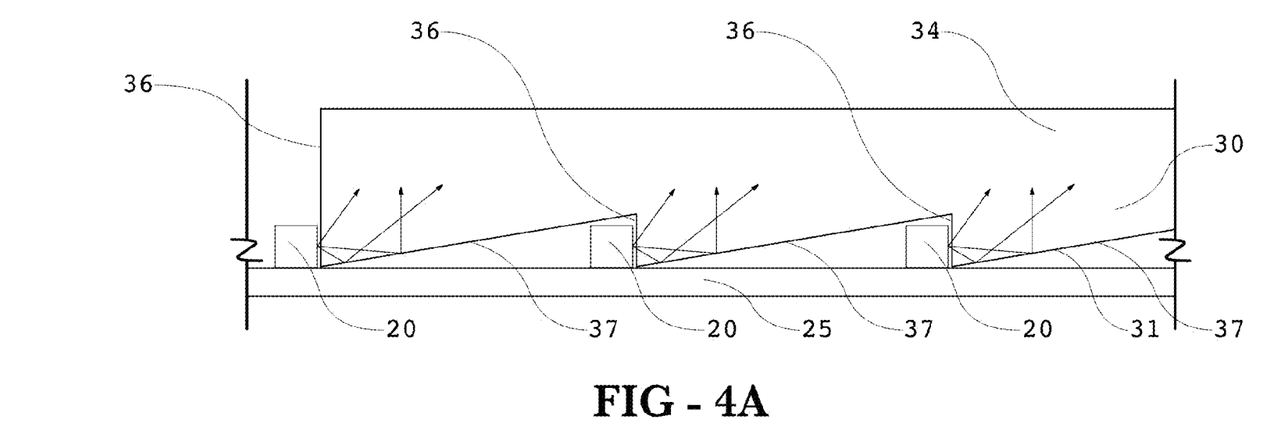
FIG. 4A is a side planar view of Detail 4 from FIG. 3.
Figure 4B:
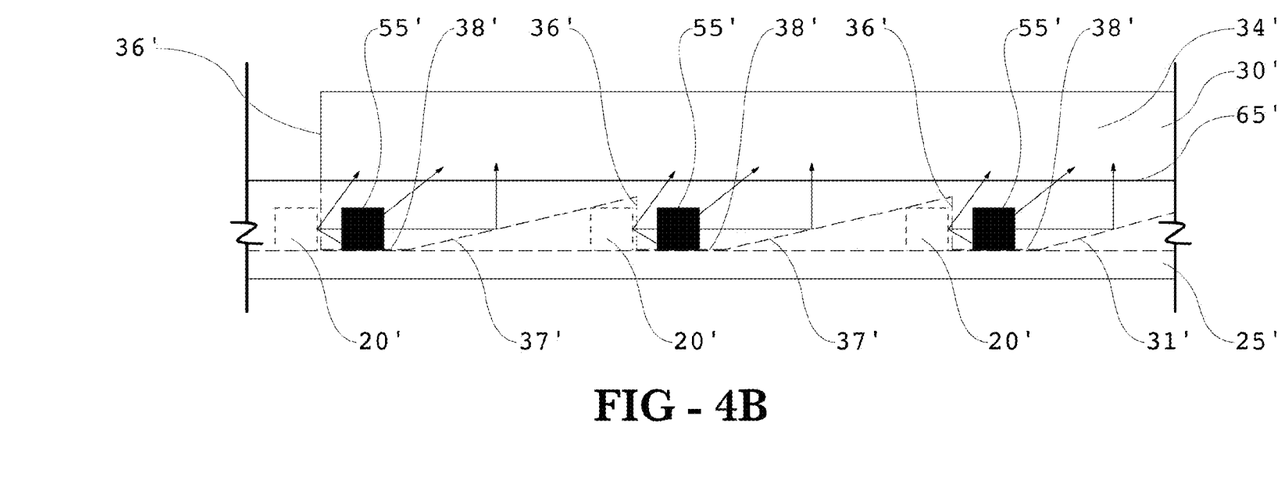
FIG. 4B is a side planar view of an alternative embodiment for Detail 4 from FIG. 3.

FIG. 3 also indicates the location of Detail 4 which is shown in FIGS. 4A and 4B.

FIG. 4A is a side planar view of Detail 4 from FIG. 3. In this embodiment, the light rays of the first plurality of LEDs 20 preferably enter the light guide 30 primarily through the vertical sub-surfaces 36. Optionally, the vertical sub-surfaces 36 may scatter the light as it enters the light guide 30. Also optionally, the interior of the light guide 30 can scatter the light once it enters the light guide 30. Once inside the light guide 30, the light rays may interact with the slanted sub-surfaces 37 where it may be reflected towards the light emitting surface 32 of the light guide 30. Optionally, the slanted sub-surfaces 37 may also scatter the light while reflecting it towards the light emitting surface 32.

For this embodiment, the light guide 30 can be described as having a first 33 and second 34 pair of opposing edge surfaces which may be used to define the periphery of the light guide. The first pair of opposing edge surfaces 33 may be parallel (or substantially parallel) with the substantially vertical sub-surfaces 36 of the saw-tooth light collecting surface 31 of the light guide 30. Also in this embodiment, the second pair of opposing edge surfaces 34 are generally orthogonal (or normal) to the substantially vertical sub-surfaces 36 and the first pair of opposing edge surfaces 33. As shown in FIGS. 1-3, the second plurality of LEDs 55 and optional third plurality of LEDs 50 are generally oriented in an edge-lit fashion along at least one of the second pair of opposing surfaces 34 which are generally orthogonal to the vertical sub-surfaces 36.

FIG. 4B is a side planar view of an alternative embodiment of Detail 4 from FIG. 3. Similar to the previously described embodiment, the light rays of the first plurality of LEDs 20' preferably enter the light guide 30' primarily through the vertical sub-surfaces 36'. Optionally, the vertical sub-surfaces 36' may scatter the light as it enters the light guide 30'. Also optionally, the interior of the light guide 30' can scatter the light once it enters the light guide 30'. Once inside the light guide 30', the light rays may interact with the slanted sub-surfaces 37' where it may be reflected towards the light emitting surface 32' of the light guide 30'. Optionally, the slanted sub-surfaces 37' may also scatter the light while reflecting it towards the light emitting surface 32'.

For this particular embodiment, the light collecting surface 31' contains an additional substantially horizontal sub-surface 38' which connects the vertical sub-surface 36' with the slanted sub-surface 37'. The addition of the horizontal sub-surface 38' increases the surface area of the edge surface 34' which is adjacent to the mounting structure 25' for the various LEDs. A NVIS filter 65' may be placed between the second plurality of LEDs 55' (here the night-mode LEDs) and at least a portion of the edge surface 34' of the light guide 30'. This embodiment allows the second plurality of LEDs 55' (here the night-mode LEDs) to be placed directly adjacent to the saw-tooth profile (rather than above the saw-tooth profile as shown in FIGS. 1A-3). Specifically in reference to FIG. 4B, the light emanating from the second plurality of LEDs 55' would be directed into the page (i.e. through the NVIS filter 65' and into the light guide 30). Thus, the second plurality of LEDs 55' and the NVIS filter 65' have been shown with solid lines while the sub-surfaces 36', 37', and 38' as well as the first plurality of LEDs 20' are shown with hidden lines. In this embodiment, the first plurality of LEDs 20' and the second plurality of LEDs 55' may be placed on the same mounting structure 25'.

While FIGS. 1A-4B show the surfaces 33, 34, 36, and 37 as substantially flat surfaces, other embodiments may use a curved profile for surfaces 33, 34, 36, and/or 37. Thus, these surfaces may be curved to perform a lens-like functionality or perform other enhanced optical features including, but not limited to, collimation, steering, and/or diffusion of light.

Figures 5A, 5B:
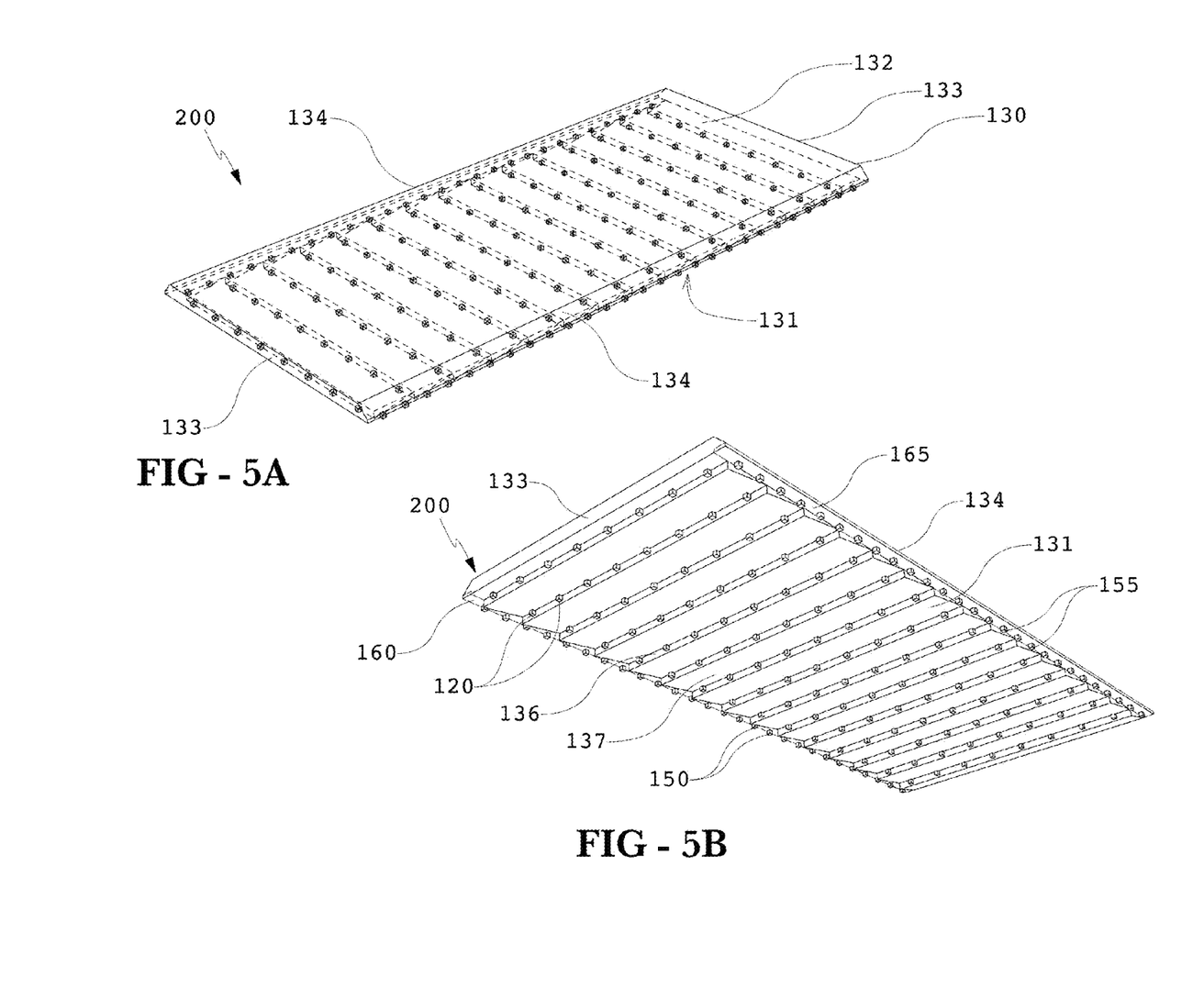
FIG. 5A is a top perspective view of another embodiment for the backlight device.
FIG. 5B is a bottom perspective view of the embodiment of the backlight device from FIG. 5A.
Figure 6:
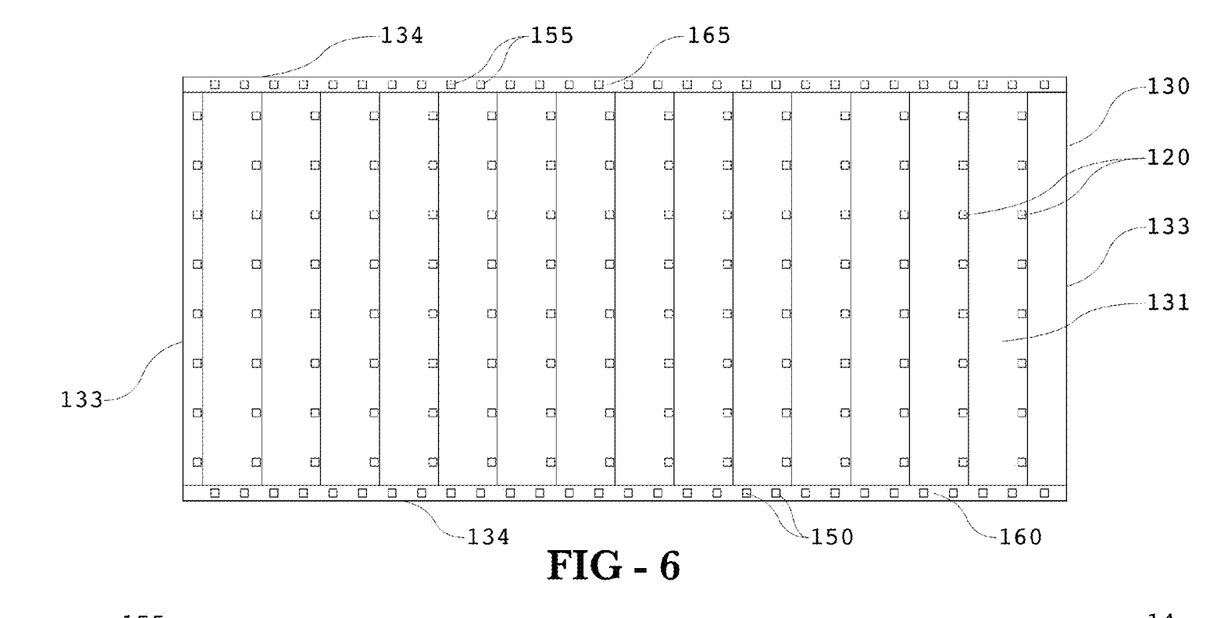
FIG. 6 is a planar bottom view of the embodiment from FIGS. 5A and 5B.

FIG. 5A is a top perspective view of another embodiment for the backlight device 200. FIG. 5B is a bottom perspective view of the embodiment of the backlight device 200 from FIG. 5A. FIG. 6 is a planar bottom view of the embodiment from FIGS. 5A and 5B.

A light collecting surface 131 is adapted to collect light from a first plurality of LEDs 120. A light emission surface 132 may oppose the light collecting surface 131 and is adapted to emit light into the liquid crystal display stack (or whatever component is placed between the backlight device 200 and the liquid crystal display stack). A first 133 and second 134 pair of opposing edge surfaces may be used to define the periphery of the light guide 30. A NVIS filter 165 may be placed adjacent to at least one of the edge portions 134. A second plurality of LEDs 155 are preferably arranged so that the light is emitted through the NVIS filter 165 and into the light guide 130. Some embodiments may also include a second NVIS filter 160 and a third plurality of LEDs 150 arranged so that the emitted light passes through the second NVIS filter 160 and into the light guide 130. The optional second NVIS filter 160 and third plurality of LEDs 150 are preferably placed on the edge surface which opposes the first NVIS filter 165 and second plurality of LEDs 155, but this is not required.

Figure 7:
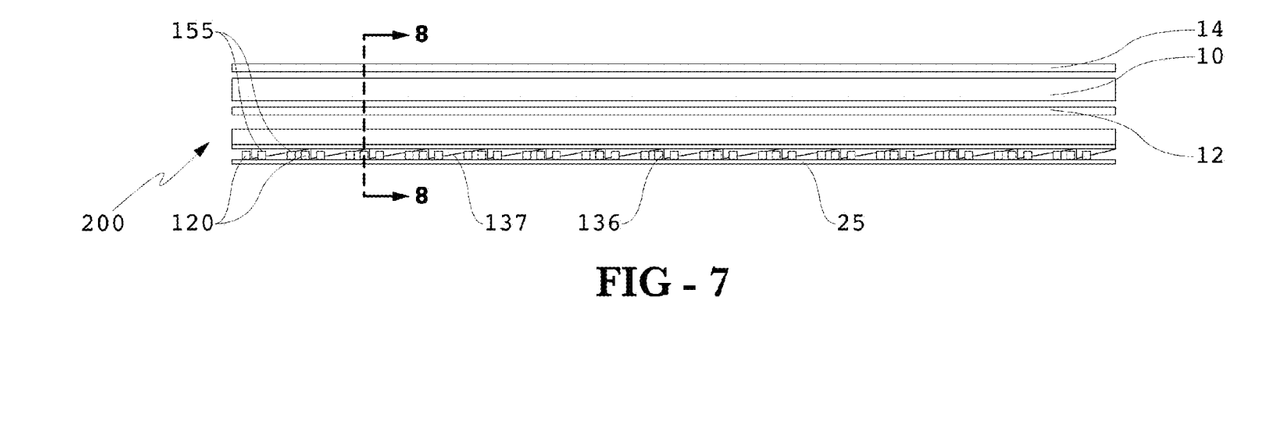
FIG. 7 is a planar side view of an exemplary embodiment of a liquid crystal display using the embodiment of the backlight device from FIGS. 5A, 5B, and 6.

FIG. 7 is a planar side view of an exemplary embodiment of a liquid crystal display using the embodiment of the backlight device from FIGS. 5A, 5B, and 6. The typical components for an LCD are shown: a front polarizer 14, a liquid crystal stack 10, and a rear polarizer 12. As discussed above and well known in the art, LCD assemblies may contain a variety of additional layers. These are not necessary or critical to the exemplary embodiments herein though, and will not be discussed further.

Similar to the embodiments described above, the light collecting surface 131 of the light guide 130 uses a 'saw-tooth' type of profile for the light collecting surface 131 which, in this embodiment is comprised of alternating substantially vertical sub-surfaces 136 and slanted sub-surfaces 137. For the daytime operations of the display, the first plurality of LEDs 120 (daytime) may be placed adjacent to the various vertical sub-surfaces 136 of the light guide 130. These daytime LEDs 120 may be mounted to a supporting structure 125 which may be a printed circuit board (PCB).

Figure 8:
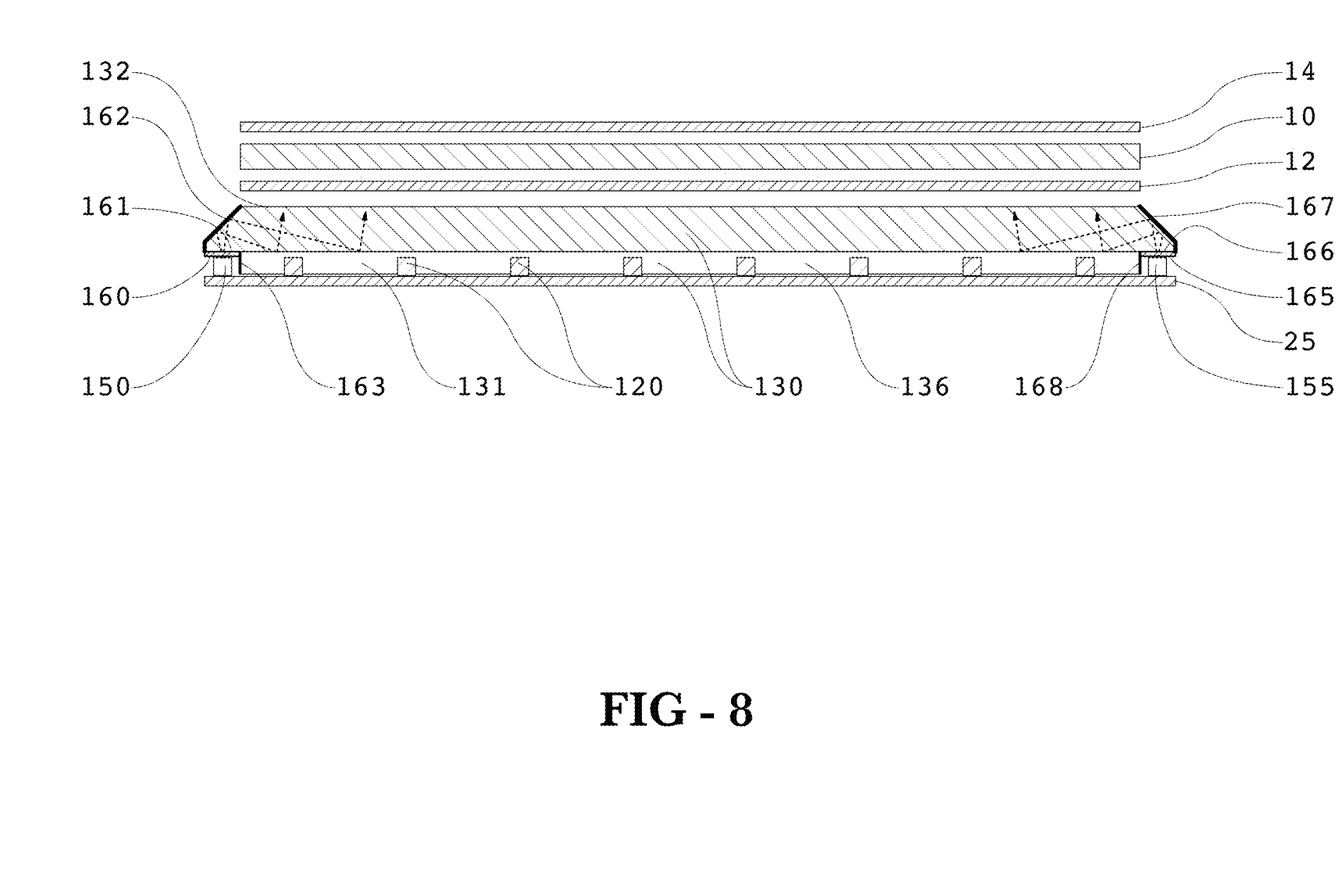
FIG. 8 is a sectional view along section line 8-8 indicated in FIG. 7.

FIG. 8 is a sectional view along section line 8-8 which cuts through a row of the first plurality of LEDs 120 in FIG. 7. In this embodiment, a substantially horizontal surface 166 extends outwardly from the light collecting surface 131 of the light guide 130. A slanted surface 167 connects the horizontal surface 166 with the light emitting surface 132. A NVIS filter 165 is preferably placed adjacent to the substantially horizontal surface 166. A second plurality of LEDs 155 (here night-mode LEDs) is preferably arranged below the horizontal surface 166 and NVIS filter 165 so that the emitted light primarily passes through the NVIS filter 165, horizontal surface 166, and reflects off slanted surface 167.

If desired, a similar arrangement can be placed on the opposing edge surface. Thus, a second substantially horizontal surface 161 could extend outwardly from the light collecting surface 131 of the light guide 130. A slanted surface 162 connects the horizontal surface 161 with the light emitting surface 132. A NVIS filter 160 is preferably placed adjacent to the substantially horizontal surface 161. A third plurality of LEDs 150 (here night-mode LEDs) is preferably arranged below the horizontal surface 161 and NVIS filter 160 so that the emitted light primarily passes through the NVIS filter 160, horizontal surface 161, and reflects off slanted surface 162.

It is preferable that slanted surfaces 162 and 167 are reflective. It is more preferable that slanted surfaces 162 and 167 have highly reflective and scattering properties (techniques for these properties are discussed below). It may also be preferable to place a reflective surface 168 between the second plurality of LEDs 155 and the light collecting surface 130 (and/or vertical sub-surface 136) of the light guide 130 to prevent unfiltered electromagnetic radiation from entering the light guide 130 (and ultimately the LCD). Similarly, it may also be preferable to place a reflective surface 163 between the third plurality of LEDs 150 and the light collecting surface 130 (and/or vertical sub-surface 136) of the light guide 130. In these embodiments, the reflective surfaces 168 and 163 may be oriented substantially vertically.

Optionally, the light guide 130 may be substantially rectangular in shape while the slanted reflective surfaces 162 and 167 are formed as separate surfaces. There exists a very wide range of options for forming surfaces 162 and 167, including but not limited to bulk metal, bulk glass, and pre-form plastics and metals. Those skilled in the art will envision many possibilities for forming surfaces 162 and 167, with some approaches having advantages over others in particular applications. Although shown in the figures as flat, further embodiments may provide a curved profile for surfaces 161, 162, 166 and 167. Thus, these surfaces may be curved to perform a lens-like functionality or perform other enhanced optical features including, but not limited to, collimation, steering, and/or diffusion of light.

It should be noted that although the NVIS filters and associated LEDs are shown along opposing edges 134, they could alternatively be placed along opposing edges 133. Further, NVIS filters and associated LEDs could be placed along both opposing edges 134 and opposing edges 133 (so as to substantially surround the entire periphery of the light guide 130).

Figure 9:
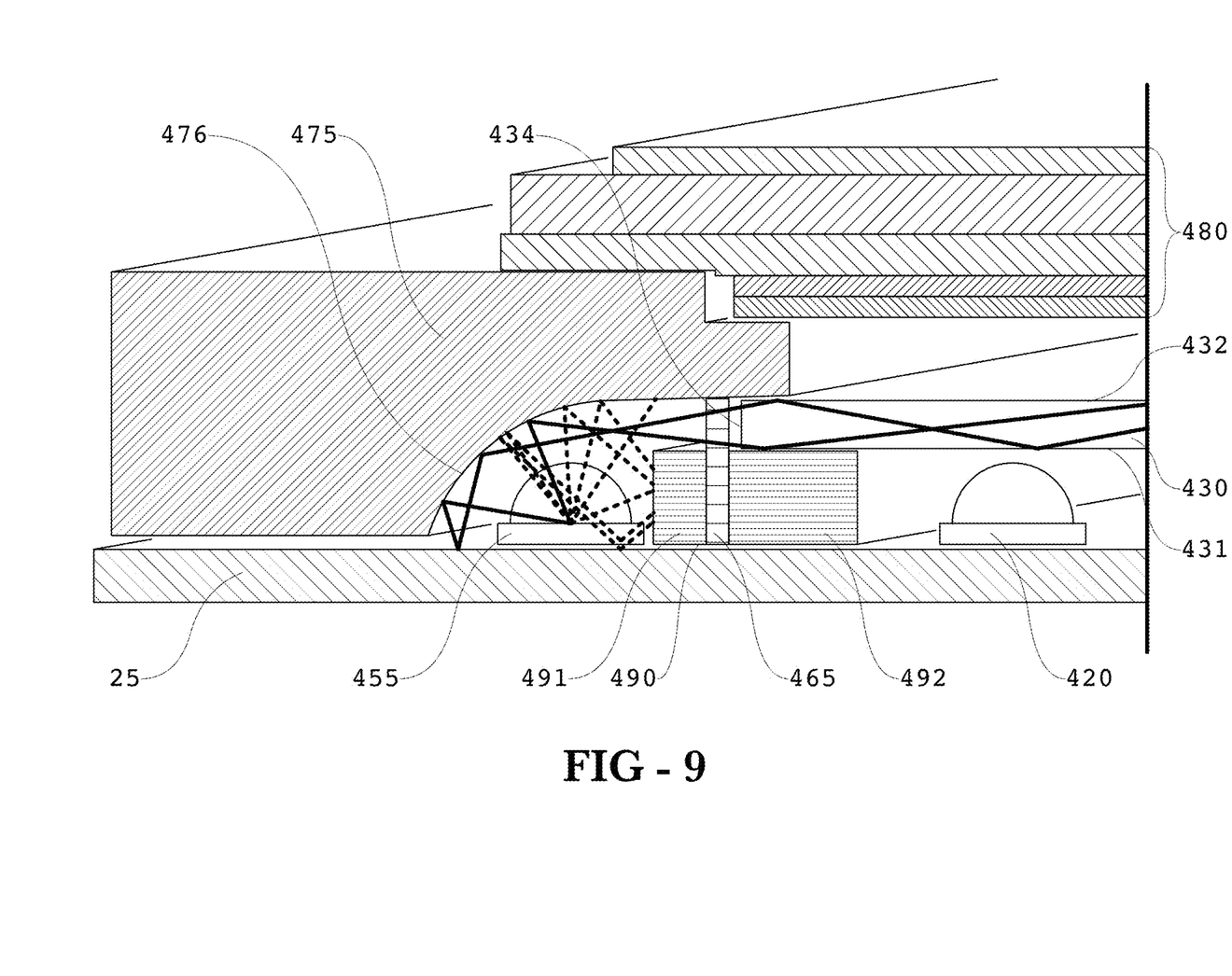
FIG. 9 is a perspective sectional view of another embodiment of the backlight device used in a liquid crystal display.

FIG. 9 is a perspective sectional view of another embodiment of the backlight device used in a liquid crystal display. A generally planar light guide 430 may be used which contains a light collecting surface 431 which is adapted to collect light from a first plurality of LEDs 420. (The light guide 430 is not shown cross-hatched for clarity) In this embodiment, the first plurality of LEDs 420 are arranged in a traditional direct-lit fashion (i.e. oriented so that the axis of the strongest portions of emitted light are oriented vertically or, perpendicular to the associated liquid crystal stack). A light emission surface 432 may oppose the light collecting surface 431 and is adapted to emit light into the LCD components 480. Two pairs of opposing edge surfaces may be used to define the periphery of the light guide 430. Since FIG. 9 is a partial section view, only one edge surface 434 is shown, but this edge could be any one of the opposing edge surfaces of the light guide 430. A NVIS filter 465 may be placed adjacent to at least one of the edge surfaces (here its adjacent to edge surface 434). A second plurality of LEDs 455 are preferably arranged so that the light is emitted through the NVIS filter 465 and into the light guide 430. Some embodiments may also include a second NVIS filter and a third plurality of LEDs arranged so that the emitted light passes through the second NVIS filter and into the light guide 430. The second NVIS filter and third plurality of LEDs would preferably be placed on the edge surface which opposes the first NVIS filter 465 and second plurality of LEDs 455, but this is not required. As discussed above, third and fourth NVIS filters and associated LEDs can also be used so that each edge portion (or substantially the entire periphery) of the light guide contains a NVIS filter and associated LEDs.

In this embodiment, a directing element 475 is placed above and along the second plurality of LEDs 455 to direct the light through the NVIS filter 465 and into the edge surface 434 of the light guide 430. Here, the reflective surface 476 of the directing element 475 connects roughly between the mounting structure 25 and the light emitting surface 432 of the light guide 430. In this particular embodiment, the reflective surface 476 of the directing element 475 is curved, but this could also be a sloped or slanted, relatively straight line. A separating element 490 is preferably placed between the first plurality of LEDs 420 and the second plurality of LEDs 455. Here, the separating element 490 is placed below the NVIS filter 465. The separating element 490 may be reflective or absorptive and is preferably placed and chosen to prevent light from the second plurality of LEDs 455 from entering the light guide 430 without passing through the NVIS filter 465.

In this particular embodiment, the separating element 490 is comprised of separating sub-elements 491 and 492 with the NVIS filter 465 placed in between the two sub-elements 491 and 492. By using sub-elements, there can be two different properties associated with the overall separating element 490 once assembled. For example, separating sub-element 491 may have light absorbing properties while separating sub-element 492 may have light reflecting properties. Alternatively, separating sub-element 491 may have light reflecting properties while separating sub-element 492 may have light absorbing properties. Still further, both sub-elements may be reflective or absorbing or any combination in between.

As discussed above, the various LCD components 480 can vary widely are not specific to the various exemplary embodiments herein.

For the embodiments which utilize the 'saw-tooth' type of profile for the light collecting surface, the vertical sub-surfaces may be reflective over the majority of the surface but transmissive in the areas directly adjacent to the LEDs. Further, in some embodiments the edge surfaces which are adjacent to the NVIS filter may be reflective over the majority of the surface but transmissive in the areas directly adjacent to the LEDs. The vertical sub-surfaces, slanted sub-surfaces, edge surfaces, and light collecting surface may be smooth, textured/embossed, partially or wholly reflective, or any combination of these.

The light guide used with the various embodiments can have internal properties which are tailored to the specific application. By way of example and not by way of limitation, the internal properties of the light guide may be: optically clear, translucent, having light scattering particles, embedded features (ex. reflective wires, wire meshes, discrete reflectors/diffusing elements), or any combination of these.

As used herein, an NVIS filter is any device which is capable of removing or reducing wavelengths (typically longer than ~650 nm) of electromagnetic radiation which may disrupt the NVIS components. In some embodiments, the NVIS filter may be a hot mirror that substantially reflects wavelengths longer than ~650 nm. In other embodiments the NVIS filter may be a film or substrate which substantially absorbs wavelengths longer than ~650 nm. The NVIS filters may be a singular 'strip' of material which covers the edge surface of the light guide which is adjacent to the night-mode LEDs. Alternatively, the NVIS filters may comprise several strips or discrete pieces of material which are placed adjacent to one another.

Although some of the embodiments shown with a landscape-type orientation, the exemplary embodiments of the backlight device taught herein can be used with any orientation of LCDs (landscape, portrait, square, or any other shape/orientation). However, if a landscape orientation is being used, it is preferable to place the second or third plurality of LEDs along the longer edge of the display to achieve the best luminance uniformity and power density. It is also preferable to use a large number of low-power LEDs in order to increase the luminance uniformity and efficiency of the backlight device.

The light guide 30 may be constructed out of a variety of materials. Typically, the base material for a light guide is a transparent or semi-transparent plastic or glass. A variety of techniques can be applied to the base material to produce the light scattering effects discussed herein. A light scattering surface may have texture applied through a number of processes including but not limited to: sanding, abrasion, laser etching, sand blasting, and acid etching. If producing a light guide by injecting liquid or molten material into a mold, the surface textures may be present within the mold cavities. Alternatively, or in addition to the surface texture, particulate may be deposited on one or more surfaces of the light guide. Still further, patterns may be printed onto one or more surfaces of the light guide using ink jet, screen printing, laser, or other printing techniques.

The LEDs may comprise a plurality of 'white' LEDs or may comprise a combination of non-white LEDs which, when combined together, produce white light. One possible combination would be red, green, and blue LEDs. Some embodiments may contain other arrangements as any number of different LED arrangements can be practiced with the embodiments herein.

It should be noted that for the sake of explanation and clarity the various figures may not be drawn to scale. Specifically, as many LCD layers are extremely thin, some portions have been enlarged or simplified for explanatory purposes. The relative size and spacing of the LEDs may be enlarged for clarity purposes.

While certain embodiments of the present invention are described in detail above, the scope of the invention is not to be considered limited by such disclosure, and modifications are possible without departing from the spirit of the invention as evidenced by the following claims:

What is claimed is:

1. A backlight device for a liquid crystal display comprising:
   a substantially planar light guide comprising:
      a light emission surface;
      a light-collecting portion opposing the light emission surface;
      four edge portions defining a periphery of the planar light guide;
   a first plurality of LEDs arranged to direct the emitted light from the first plurality of LEDs into the light-collecting portion;
   a first NVIS filter placed adjacent to one of the edge portions; and
   a second plurality of LEDs arranged to direct the emitted light from the second plurality of LEDs through the NVIS filter and into an edge portion;
   where the first and second plurality of LEDs are arranged such that the axis of the strongest portions of emitted light are substantially parallel to one another.

2. The backlight device of claim 1 further comprising:
   a second NVIS filter placed adjacent to the edge portion opposite the edge portion containing the first NVIS filter; and
   a third plurality of LEDs arranged to direct the emitted light from the third plurality of LEDs through the second NVIS filter and into the edge portion.

3. The backlight device of claim 1 further comprising:
   a directing element placed adjacent to the second plurality of LEDs which directs the emitted light from the second plurality of LEDs through the first NVIS filter and into the light guide.

4. The backlight device of claim 1 further comprising:
   a mounting structure attached to both the first and second plurality of LEDs.

5. The backlight device of claim 1 further comprising:
   light scattering features within the light guide.

6. A backlight device comprising:
   a light guide plate comprising
      a light emission surface,
      a saw-tooth surface opposing the light emission surface,
      four edge portions defining a periphery of the planar light guide;
   a first plurality of LEDs arranged to direct the emitted light from the first plurality of LEDs through the saw-tooth surface;
   a first NVIS filter placed adjacent to one of the edge portions; and
   a second plurality of LEDs arranged to direct the emitted light from the second plurality of LEDs through the NVIS filter and into the light guide plate.

7. The backlight unit of claim 6 wherein:
   the NVIS filter is a hot mirror filter.

8. The backlight unit of claim 6 further comprising:
   a second NVIS filter placed adjacent to the edge portion opposite the edge portion which contains the first NVIS filter; and
   a third plurality of LEDs arranged to direct the emitted light from the third plurality of LEDs through the second NVIS filter and into the edge portion of the light guide.

9. The backlight unit of claim 6 wherein:
   the substantially vertical sub-surfaces have a curved profile.

10. The backlight device of claim 6 further comprising:
    a directing element placed adjacent to the second plurality of LEDs which directs the emitted light from the second plurality of LEDs through the first NVIS filter and into the light guide.

11. The backlight device of claim 10 further comprising:
    a mounting structure attached to both the first and second plurality of LEDs.

12. The backlight device of claim 6 further comprising:
    light scattering particles within the light guide.

13. A backlight device comprising:
    a light guide plate comprising
       a light emission surface,
       a saw-tooth surface opposing the light emission surface and defined by a plurality of alternating substantially vertical sub-surfaces, substantially horizontal sub-surfaces, and slanted sub-surfaces,
       a first pair of opposing edges, and a second pair of opposing edges which are substantially orthogonal to the first pair of opposing edges;

a first plurality of LEDs arranged to direct the emitted light from the first plurality of LEDs through the saw-tooth surface;

a NVIS filter placed adjacent to one of the second pair of opposing edges of the light guide; and a second plurality of LEDs arranged adjacent to the NVIS filter with at least one LED adjacent to each substantially horizontal sub-surface to direct the emitted light from the second plurality of LEDs through the NVIS filter and into the light guide plate.

14. The backlight device of claim 13 further comprising:
a mounting structure attached to both the first and second plurality of LEDs.

15. The backlight device of claim 13 wherein:
the substantially vertical sub-surfaces have a curved profile.

16. The backlight device of claim 13 further comprising:
light scattering features within the light guide.

17. A backlight device for a liquid crystal display comprising:

a substantially planar light guide comprising:
   a light emission surface;
   a light-collecting surface opposing the light emission surface;
   four edge portions defining a periphery of the light guide, at least one of the edge portions comprising:
     a substantially horizontal surface extending outwardly from the light-collecting surface and
     a slanted surface connecting the substantially horizontal surface with the light emission surface;

a first plurality of LEDs arranged within a first plane to direct the emitted light from the first plurality of LEDs into the light-collecting portion;

a NVIS filter placed adjacent to the substantially horizontal surface; and a second plurality of LEDs arranged within the first plane to direct the emitted light from the second plurality of LEDs through the NVIS filter.

18. The backlight device of claim 17 wherein:
the slanted surface is reflective.

19. The backlight device of claim 17 wherein:
the first plurality of LEDs are oriented so as to emit the strongest light in the vertical direction.

20. A backlight device for a liquid crystal display comprising:

a substantially planar light guide comprising:
   a light emission surface; and
   a light-collecting surface opposing the light emission surface; and
   four edge portions defining a periphery of the light guide;

a mounting structure placed adjacent to the light-collecting surface and substantially parallel to the planar light guide;

a first plurality of LEDs placed on the mounting structure to direct the emitted light from the first plurality of LEDs into the light-collecting portion;

a NVIS filter placed adjacent to one of the edge portions and oriented substantially perpendicular to the mounting structure;

a directing element placed adjacent to the NVIS filter; and a second plurality of LEDs placed on the mounting structure and below the directing element so that the emitted light from the second plurality of LEDs reflects off the directing element and through the NVIS filter.

* * * * *